DONALD E. WOESSNER
INVENTOR.

BY Sidney C. Johnson

Oct. 19, 1965    D. E. WOESSNER    3,213,355
NMR MEASUREMENT OF CONTAINER DIMENSIONS
Filed April 6, 1962    3 Sheets-Sheet 2

DONALD E. WOESSNER
INVENTOR.

Oct. 19, 1965     D. E. WOESSNER     3,213,355
NMR MEASUREMENT OF CONTAINER DIMENSIONS
Filed April 6, 1962     3 Sheets-Sheet 3

DONALD E. WOESSNER
INVENTOR.

BY *Sidney A. Johnson*

United States Patent Office 3,213,355
Patented Oct. 19, 1965

3,213,355
NMR MEASUREMENT OF CONTAINER
DIMENSIONS
Donald E. Woessner, Dallas, Tex., assignor to Socony
Mobil Oil Company, Inc., a corporation of New York
Filed Apr. 6, 1962, Ser. No. 185,617
4 Claims. (Cl. 324—.5)

This application is a continuation-in-part of my application Serial No. 39,294, filed June 28, 1960, for Field Gradient Measurement of Self Diffusion Constant, now U.S. Patent No. 3,109,986.

This invention relates to nuclear magnetic resonance and more particularly to measurement of the size of pores or containers in which a test material is placed.

It has been found that materials which may be polarized in a magnetic field exhibit a macroscopic magnetic moment. The nuclei in such materials may then be forced into motion in such magnetic field. The detection of such motion under certain conditions can yield useful information as to the character of the material. Such nuclear magnetic resonance techniques have been disclosed in U.S. Patent No. 2,561,489 to Bloch et al.

It has been found that the self-diffusion constant of a material is a characteristic upon which identity may be based. For example, in distinguishing between crude oil and water, the former has a self-diffusion constant of the order of $2 \times 10^{-6}$ cm.$^2$/sec. The latter has a self-diffusion constant of the order of $2.3 \times 10^{-5}$ cm.$^2$/sec. As a basis for establishing identity of nuclei, an accurate measure of the self-diffusion constant of such materials has been found to be of importance. The foregoing values are representative of characteristics of bulk liquids.

The more complex problem in which liquids are contained in porous media has been less susceptible to solution. Conventional techniques in the measurement of diffusion in such systems yields a diffusion coefficient proportional to the microscopic coefficient divided by the product of the porosity and a form factor. The values thus obtained represent averages over microscopic structures taken over a long time. In accordance with spin-echo techniques, however, values are commonly measured over a much shorter time—of the order of hundredths of a second. For such measurements, the values of diffusion for a porous medium have been found to reflect properties different than those of bulk materials.

In accordance with the present invention, it has been determined that the mean size of cavities or containers in which the liquid molecules reside is a determining factor rather than the porosity of the material. More specifically, it has been found that measurement of the diffusion constant of a liquid in a porous medium under controlled conditions may be made to be indicative of the mean pore size. When a spin-echo diffusion measurement is applied to liquids in a cavity with dimensions of the same order of magnitude as the distance that molecule diffuses during the significant time of the spin-echo diffusion measurement, the diffusion coefficient decreases from the values representative of bulk properties as the time increases.

More particularly, in accordance with the present invention there is provided a method which includes measuring the diffusion constant of a liquid in a porous medium for a first spin-echo time. Thereafter, the apparent self-diffusion constant of the same liquid is measured while in the same porous medium for a second spin-echo time.

More specifically, a container is filled with a liquid which exhibits a macroscopic magnetic moment. The liquid in the container is then subjected to nuclear magnetic resonance spectrometry including the application of pulsed magnetic fields having effective time intervals therebetween which are predetermined to produce a signal representative of the diffusion constant of the liquid. The time intervals are then varied over a time range to produce a plurality of signals representative of variations in the diffusion constant. In a preferred form the signals are recorded as function of the time intervals.

In a further aspect of the invention, there is provided a method in which nuclei of the sample of material are polarized in a unidirectional field and which includes the use of a first coil means for establishing magnetic fields in the material at a substantial angle to the unidirectional magnetic field. The coil means also serves to detect echo signals due to precession of said nuclei. A measuring means is connected to said first coil for measuring a signal representative of the amplitude of the echo signal. Control means is provided for producing variation in the gradient of the unidirectional magnetic field and for producing echo signals following application of magnetic fields angularly disposed with respect to the unidirectional magnetic field. The latter signals are then registered as functions of variations in the pulse echo time interval.

For further objects and advantages of the present invention, reference may now be had to the following description taken in conjunction with the accompanying drawings in which.

Figure 1:
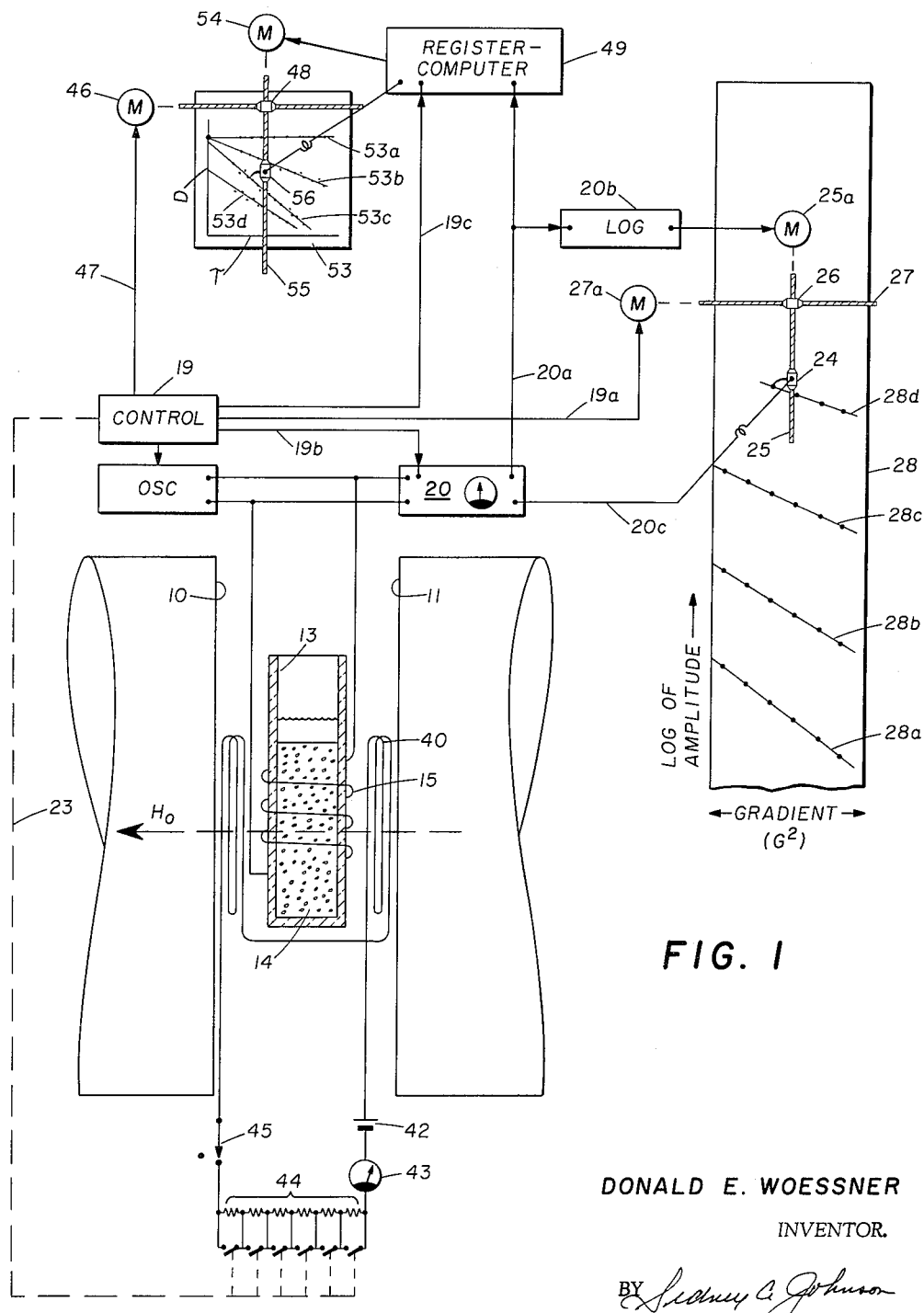
FIGURE 1 is a diagrammatic representation of a system for carrying out the present invention.

The present method and system for measuring pore size by self-diffusion coefficient measurement preferably make use of the attenuation of spin-echo amplitudes resulting from the diffusion of molecules into regions having different values of magnetic fields. In the system of FIGURE 1, a magnetic field of magnitude $H_0$ is produced by an electromagnet having opposed poles 10 and 11. An air gap 12 between the faces of poles 10 and 11 is traversed by magnetic flux. A sample holder 13 is supported in the air gap 12 and contains in the lower end thereof a porous sample material 14 which in turn contains a quantity of liquid having a macroscopic magnetic moment and thus is susceptible to measurement of self-diffusion constant by spin-echo techniques of the nature described in said application Serial No. 39,294. A coil 15 of cylindrical form encompasses the sample 14. Coil 15 is connected by conductors 16 and 17 to a pulse source 18 actuated under the control of unit 19. The coil 15 is also connected to a receiver system 20.

Figure 2:
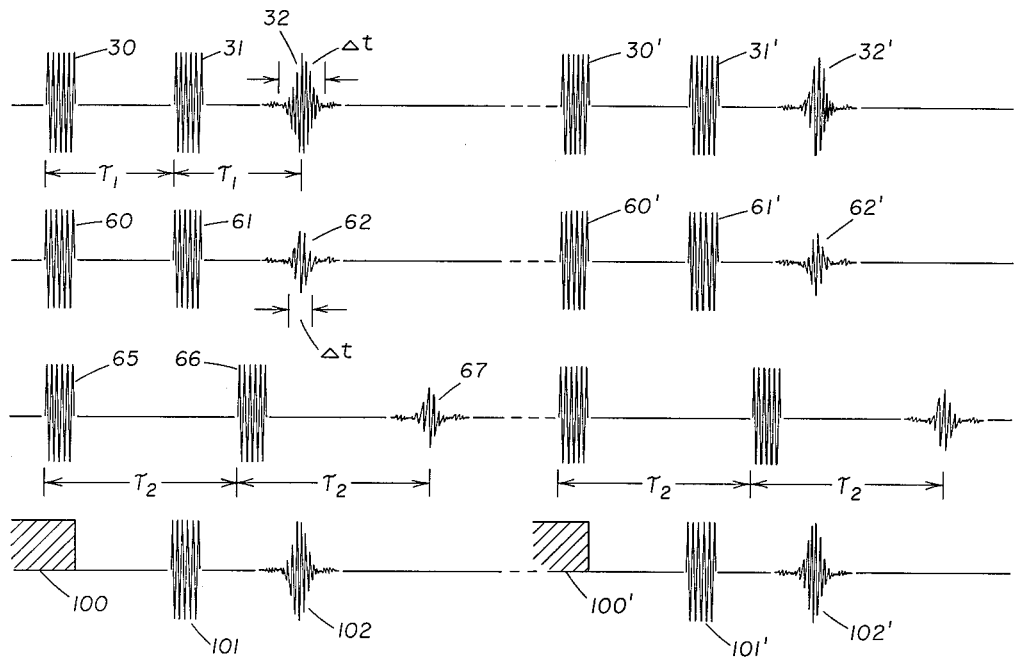
FIGURE 2 illustrates time relationships between pulses produced in the system of FIGURE 1.

Referring to FIGURE 2, alternating current pulses 30 and 31 are applied to coil 15 from oscillator 18 under operation of control unit 19. Upon excitation of coil 15, alternating magnetic field pulses are produced which are perpendicular with respect to the field $H_0$. The pulses are of a duration $t$ and are spaced apart a time interval $\tau$. Following the application of the second pulse 31 by time interval $\tau$, nuclei in sample 14 having a magnetic moment precess under the influence of field $H_0$ and attain a condition of phase coincidence at a time $\tau$ so that an echo pulse 32 may be detected in coil 15. By repeatedly applying pulses such as pulses 30, 31, 30', 31', a series of pulses 32, 32' will be produced and applied to the receiver 20. It is known in the art to measure the amplitude of pulse 32 for measurement of the transverse relaxation time $T_2$ of sample 14.

In accordance with said application Serial No. 39,294, a first set of measurements is made for registration or indication by meter 21 of the amplitude of pulse 32. Thus, the receiver 20 may comprise a peak-reading voltmeter suitably gated from control unit 19 by way of channel 22. By this means, the reading on meter 21 is proportional to the amplitude of pulse 32. Measurements of the spin-echo pulse are made under varying, but known, conditions of field gradient through the sample 14. More particularly, a pair of secondary field coils 40 and 41 are employed. The coils 40 and 41 are positioned in the air gap 12 and in axial alignment along the field $H_o$ and with the center of the sample 14. The coils 40 and 41 are connected in series opposition and are excited from a battery 42 interconnected by way of ammeter 43, control network 44, and switch 45. With switch 45 closed, current flowing from battery 42 through coils 40 and 41 alters the magnetic field in the region of sample 14.

Figure 3:
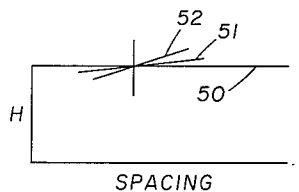
FIGURE 3 is a graph of field strength in the area of the sample of FIGURE 1.

Referring to FIGURE 3, there has been plotted magnetic field intensity H as a function of the distance across the air gap 12. The line 50 may be taken as representative of the magnitude of the field $H_o$ produced by the magnetic forces associated with poles 10 and 11. With the switches in control unit 44 in one position and switch 45 closed, current flowing through coils 40 and 41 produces the first gradient which preferably is linear across the sample 14 and which is represented by the line segment 51. Under such condition, pulses 32, 32' are obtained and the amplitude thereof is measured and/or indicated by receiver 20 and meter 21. Thereafter, switches in control unit 44 are actuated so that a different current flows through coils 40 and 41. As a result, the magnetic field gradient across the sample 14 will be altered to a second condition which may be represented by line 52. Under such condition, a second series of excitation pulses 60, 61, 60', 61' are applied to coil 15. Echo signals 62, 62' are then detected in coil 15 and are registered by receiver 20. The difference between the amplitudes of echo pulses 32 and 62 is dependent upon the magnetic field gradients across sample 14. The maximum amplitude for a particular echo signal following any two-pulse sequence occurs at time $t=2\tau$. The amplitude of the echo signal is given by the following expression:

$$E = E_o f(2\tau) \exp(-2\gamma^2 G^2 \tau^3 D/3) \quad (1)$$

in which $E_o$ is a constant dependent upon the geometry and other constants of a nuclear magnetic resonance system;
$f(2\tau)$ is the function which describes the effects of nuclear spin relaxation and spin-spin coupling;
$\gamma$ is the nuclear gyromagnetic ratio;
G is the magnetic field gradient through the sample along the direction of the magnetic field $H_o$;
$\tau$ is the time interval between pulses; and
D is the self-diffusion coefficient.

If the value of $\tau$ is held constant for all series of pulses and the amplitude E of the spin-echo signal is measured as a function of field gradient G, the value of the self-diffusion coefficient may then be calculated from the slope of a plot of the logarithm of the ampltiude E as a function of gradient squared ($G^2$).

Automatic operation may be carried out under the direction of the control unit 19. A control linkage 23 extends between control unit 19 and the switches in the unit 44 so that a step-wise variation will be produced in the current flowing through coils 40 and 41 by sequential actuation of the switches in unit 44. A recording system is provided which includes a recording element 24 mounted on a spiral positioning element 25 which in turn is mounted in a follower 26. Follower 26 is mounted on a spiral element 27. A motor 25a drives spiral 25 and a motor 27a drives spiral 27 so that the recording element 24 may be positioned at any coordinate point on the recording chart 28. Circuit 19a serves to apply a positioning function to motor 27a from control 19 so that the lateral position of the follower 26 may be proportional to the square of the gradient through sample 14. Circuit 20a leads from the receiver 20 to logarithmic amplifier 20b which drives motor 25a to position the recording element 24 along an ordinate of the chart 28 representative of the logarithm of the amplitude of the pulse measured. Circuit 20c extends from receiver 20 to recorder 24 to effect a recordation of data in timed relationship to the measurements made under the control of unit 19. By this means, a sample may be placed in tube 13; and control unit 19, following a preset program, will cause a series of data points to be printed on chart 28 which represent the variation in the amplitude of pulse 32 as a function of the gradient of the magnetic field through the sample. As illustrated in FIGURE 1, an increase in field gradient causes a decrease in pulse amplitude. The data thus derived from operation of the system will be plotted with logarithm of amplitude being a linear function of the gradient squared. It will be appreciated that recording potentiometers, such as sold by Minneapolis Honeywell Regulator Co., Philadelphia, Pennsylvania, and identified as "Electronic" Strip Chart Recorders, with a suitable printing head may be employed for recording the data as above described. However, the foregoing has been presented merely by way of illustration so that the functional relationships involved may be portrayed.

The derivation of Equation 1 assumes that the diffusing molecules move in an infinite reservoir. Where the reservoir is not infinite and the molecules encounter physical barriers in their diffusive movements, the average displacement a molecule undergoes during a given time interval is less than that for an infinite reservoir. But as the chosen time interval is decreased towards zero, the displacement of the average molecule approaches that for an infinite reservoir because fewer and fewer molecules move far enough to experience the barriers.

Whether a reservoir is "infinite" depends on the duration of time between the first pulse and the echo. Qualitatively, the average molecule must be located a distance from a barrier which is very large compared to the quantity $2(D\tau)^{1/2}$, i.e. the average distance a molecule moves in any direction during the time $2\tau$. The $\tau$ values customarily are of the order of hundredths of a second. For water, $2(D\tau)^{1/2}=14$ microns for $\tau=0.02$ second. Thus it is clear that for diffusion measurements of liquids the usual container of roughly one centimeter diameter are "infinite" reservoirs.

However, porous media would present definite barrier effects since they have pore sizes of the order 10 microns. Qualitatively, then, the spin-echo diffusion coefficients D for liquids in a porous medium are less than that for the bulk liquids, increase as $\tau$ decreases, and approach the bulk liquid values as $\tau$ approaches zero (the limiting value would be different, however, if the microscopic viscosity were not equal to the bulk liquid value).

In accordance with the present invention, a first set of measurements is made on a given liquid in a given container. The results are portrayed by the series of points falling on the line 28a. The points describing line 28a are obtained as above outlined while maintaining the time interval $\tau_1$ of FIGURE 2 constant. Variations in the amplitudes of the echo signal are then plotted as a longarithmic function of the field gradient squared.

A second set of measurements is then made. More particularly, the points describing line 28b are obtained for the same sample of material in the same container, i.e., sample holder 14, but employing a different time interval $\tau_2$ such as illustrated in FIGURE 2 where pulses 65 and 66 are followed by echo pulse 67. It will be noted that the slope of the line 28b is less than the slope of the line 28a. In a similar manner points describing line 28c are plotted for a third time value $\tau_3$. The data representative of the fourth line 28d are obtained using a fourth time value $\tau_4$.

The data which lines 28a–28d represent is indicative of the diffusion constant of the liquid in sample holder 14 for the different time values ($\tau$). If a bulk liquid is placed in the sample holder 13 with the porous holder 14 removed, then the diffusion constant would be the same for all values of $\tau$ and thus the slopes of the lines 28a–28d would, in general, be identical. However, since the liquid is bounded by the walls of the pore spaces in the container 14, variations in the apparent diffusion constant are encountered.

To provide a measure of the container size, a second recorder having elements corresponding with those of recorder 24 is included in the system of FIGURE 1. A motor 46 is energized by the control unit 19 being connected thereto by way of channel 47. The motor 46 serves to move a follower 48 laterally across the face of a chart 53 in proportion to the magnitude of the time intervals $\tau_1$–$\tau_4$. A second motor 54 serves to drive element 55 so that follower 56 moves in the second coordinate across chart 53 in proportion to the value of the diffusion constant represented by each of the lines 28a–28d. It will be noted that channel 19c is connected from control unit 19 to a register-computer 49. In addition, the channel 20a leading from the metering unit 20 extends to a second input of the register-computer 49. Thus, unit 49 accumulates the values of data from unit 20 to provide a function for driving motor 54 representative of the apparent diffusion constant portrayed by each of the curves 28a–28d and to actuate the unit 56 to plot a given point. Channel 49a connects an output of unit 49 to printer 56.

Figure 5:
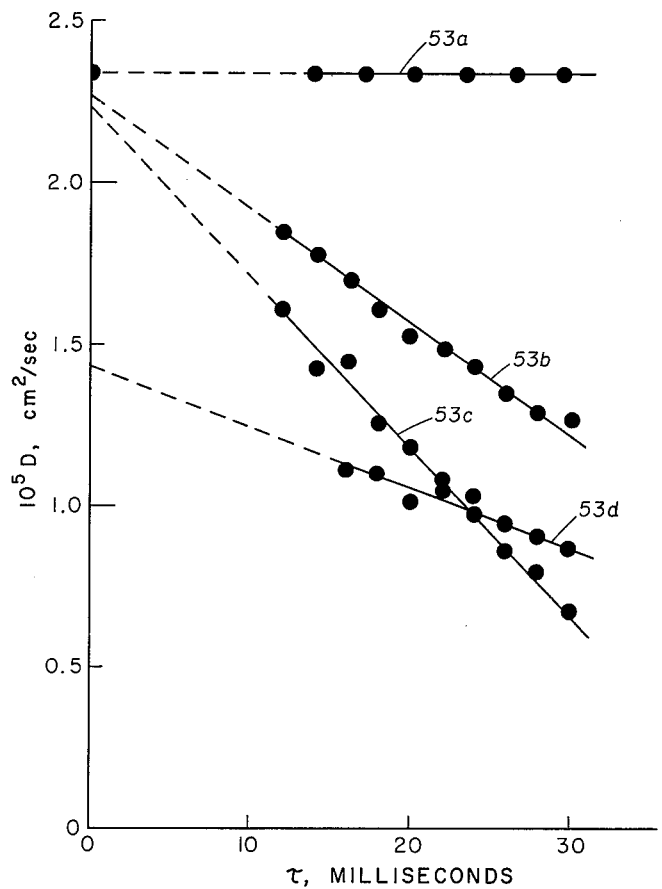
FIGURE 5 is a graph showing time dependent variations of diffusion constants.

It will be noted that data representing four curves are plotted on chart 53. The chart 53 is shown in the enlarged view of FIGURE 5 where diffusion constant (D) has been plotted as ordinates along the abscissa scaled in terms of $\tau$. A first curve 53a is a horizontal line and is representative of the bulk diffusion constant of the liquid in sample holder 13. The line 53b is representative of variations in the apparent diffusion constant for the same liquid in a first container having a mean size of a first average dimension. The third line 53c represents variations in the apparent diffusion constant of the same liquid in a second container having pore dimensions of a second average size. The fourth line 53d represents still further test conditions. It will be seen that the apparent diffusion constant as represented by the slope of lines 53a–53d varies with the type of container. The slope of the line obtained varies as a function of the time interval $\tau$ and is indicative of pore size. A given system utilizing a given test liquid may thus be calibrated in terms of container size.

More particularly, measurements of the following nature were made in specific systems. Line 53b shows the values for water in a slurry of 10 micron silica gel spheres. Line 53c gives the values for water in a porous sandstone (Safaniya Field, 5500–6000 millidarcies gas permeability, roughly 33% porosity and 22–28 microns median pore size). These results show that the plots are apparently linear and the extrapolated values at $\tau=0$ are nearly the diffusion constant for bulk water, $2.34 \times 10^{-5}$ cm.²/sec. Note that the magnitude of the slope is greater for the sandstone core. The core should be the more effective barrier.

Measurements were then made on an entirely different system, i.e., benzene absorbed in a piece of soft rubber. A piece of soft pink rubber stopper adsorbed benzene until a benzene-to-rubber volume ratio of 2.6 at saturation was found. The spin-echo diffusion coefficients are given in line 53d. The magnitude of the slope is smaller than for the previous cases. Note especially that the value extrapolated at $\tau=0$ is nowhere near the bulk liquid value of $2.06 \times 10^{-5}$ cm.²/sec. Instead, it is very close to ⅔ the liquid value.

The extrapolated value at $\tau=0$ may be considered to reflect the decreased mobility of the benzene molecules among the polymer chains compared to the mobility in the pure liquid; the slope may be considered to reflect the obstructive effects to diffusional motion due to the mere presence of the polymer chains.

There are limitations to the $\tau$ values experimentally realizable for effective measurements of diffusion. Equation 1 expresses the fact that in order to obtain a good value of diffusion, the quantity $2\gamma^2 G^2 \tau^3 D/3$ should be of the order of unity. Hence G must be large when small $\tau$ values are desired. With spin-echo apparatus employed in the above measurements, the lower limit of $\tau$ values is 10 to 12 milliseconds if good data are to be obtained. For large $\tau$ values, G must be small. To obtain good diffusion values, G must be large compared to inhomogeneities of the large magnetic field. In order to observe a spin-echo, $\tau$ cannot be too much greater than $T_2$; this also sets an upper $\tau$ limit.

In one system employed for carrying out the invention, a magnetic system having six-inch pole faces was employed with a magnetic field of 6,220 gauss. The gradient was produced in such field by the use of coils 40 and 41, each of which comprised 120 turns of number 28 copper wire positioned on opposite sides of the sample adjacent to but spaced about one-fourth inch from the pole faces. The air gap 12 was of the order of two inches in length. The values of the resistances in control unit 44 were selected so that an adequate number of reasonably uniformly-spaced values along the gradient scale ($G^2$) were available. The combined resistances of all elements in control unit 44 were about twice the combined resistances of coils 40 and 41. Currents employed were of the order of a few tenths of an ampere.

In the system above described, the magnetic field gradient through sample 14 was determined to be about twenty-two gauss per centimeter when current through coils 40 and 41 was one ampere. The resistance elements in unit 44 were varied so that the field gradient was varied through a range between twenty-two gauss per centimeter and zero so that sufficient data were obtained to determine the slope of the variation in amplitude with field gradient squared.

The sample 14 was placed in a tube of diameter $d=¼$ inch. If the product of gradient G times tube diameter $d$ becomes substantial, then the amplitude of echo signals 32, 62 is substantially decreased because not all nuclei are nutated through the same angle by application of pulses 30 and 31. Experimental measurements indicated that the numerical coefficient of the exponential in Equa- 1 is independent of the angles of nutation produced by application of pulses 30 and 31 and the deviations from exact resonances. However, an excessive value for the product Gd is important in the present invention because the amplitude of the pulse echo signal is not so independent. For very short values of time $\tau$, those values in which the exponential in Equation 1 is unity, the amplitude of the echo signal 32, 62 has been measured as a function of the ratio $Gd/H_1$, where $H_1$ is the amplitude of one rotating component of the A.C. pulses 30 and 31. The decrease of the amplitude of the echo pulses 32, 62 is five percent when the function $$\frac{Gd}{H_1} = 1$$

This decrease varies in accordance with the expression $$5\left(\frac{Gd}{H_1}\right)^2$$

up to the point $$\frac{Gd}{H_1} = 3$$

Thus, it is evident that any error introduced by the selection of parameters may be rendered negligible if the factor $H_1$ is several times larger than the product Gd.

It has been found necessary to employ magnetic field gradients of substantial magnitude where the self-diffusion coefficients of liquids have either short values of transverse relaxation time $T_2$ or have small self-diffusion coefficients.

Figure 4:
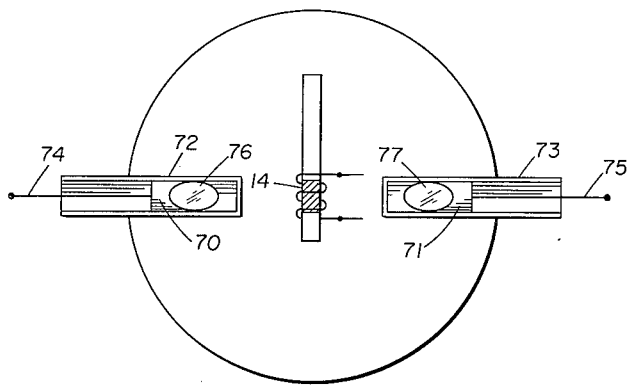
FIGURE 4 illustrates a modified system which may be used in performing the method of the invention.

In the system of FIGURE 1, the method of the present invention was illustrated through using the instrumentalities of coils 40 and 41 to vary field gradients between at least two different values for modifying the amplitude of nuclear magnetic resonance echo signals. It will be recognized that other suitable means may be employed for modifying the field gradient. For example, as illustrated in FIGURE 4, cylinders 70 and 71 of magnetic material positioned in nonmagnetic tubes 72 and 73, respectively, may be moved manually by means of handles 74 and 75 into different positional relationship with respect to sample 14, thereby to alter the magnetic field gradient across the sample 14. It has been found preferable to modify the field across sample 14 while mantaining a linear gradient. Thus, in FIGURE 4, the magnetic elements 70 and 71 have beveled faces 76 and 77 so shaped that movement toward or away from sample 14 will maintain linear the gradient in flux through sample 14.

It will be readily appreciated that other modes of variation in field gradient may be employed. Thus, applicant's method is not limited to a particular apparatus but may be performed at least by hand though the actuation of handles 74 and 75. It may be carried out at least in part by the manual control of switches in control unit 44, manual control of the value of $\tau$ from unit 19 and manual setting of the followers on the recorders. Alternatively, the control unit 19 may be provided with a suitable linkage 80 leading to the switches in control 40 for automatic variation of the gradient through sample 14.

While it will be preferred that the magnitude of the gradient through sample 14 be known, calibration procedures may be employed to yield useful measurements even though the exact value is not known. However, to obtain the value of the gradient, the coils 40 and 41 may be calibrated by using a cylindrical sample 14 of diameter $d$ and measuring the time interval $\Delta t$, FIGURE 2, between the phase minima on each side of the spin-echo signal 32 and using the relationship $$G = \frac{15.33}{\gamma d} \Delta t$$

The foregoing relationship is understood by those skilled in the art and has been discussed in a paper published in Physical Review, 1954, volume 94, page 630. For this purpose, it will be preferred to use a sample holder 13 of precisely known diameter so that the above computation can be relied upon.

In connection with FIGURE 2, pulses 30, 31, 60, and 61 are alternating current, high-frequency pulses. It is to be understood that a different mode of excitation may be employed. For example, as further illustrated in FIGURE 2, a unidirectional pulse 100 may be employed for nutating nuclei from a polarized condition in the earth's magnetic field. Following the abrupt removal of the field 100, an alternating field 101 will then be applied so that the nuclei in the field $H_0$ will then precess and attain a phase relationship for the production of the spin-echo pulse 102. The amplitude of pulse 102 may then be measured by receiver 20, FIGURE 1. A program of excitation and measurement may thus be repetitively carried out through application of pulses 100', 101', and the measurement of pulse 102'. By this means, as well as through the use of A.C. pulses 30, 31, etc., magnetic fields may be employed in which the effective time intervals $\tau$ are varied to measure variations in the apparent diffusion constant of a bounded liquid.

The foregoing description relates to a preferred mode of carrying out the invention. That is, precise values of apparent diffusion constant are obtained by varying, for each $\tau$-value, the field gradient as set forth in prior application Serial No. 39,294. It will be understood, however, that the present invention may be practised to a less exact degree by making a measurement of echo pulse amplitudes at only one value of field gradient and from such value, together with values thereof at zero field gradient determining diffusion constant.

The foregoing deals with those examples wherein polarization is produced by placing a sample in an artificial magnetic field $H_0$ of high-strength. In principle at least, the measurements herein described may be carried out where the polarization is produced by the earth's field.

A bounded liquid, in either case, is subjected to spectroscopic examination wherein $\tau$-values are employed over a range in which the apparent self diffusion constant is a dependent variable.

Having described the invention in connection with certain embodiments thereof, it is to be understood that further modifications may now suggest themselves to those skilled in the art and it is intended to cover such modifications as fall within the scope of the appended claims.

What is claimed is:

1. The method of measuring mean container size which comprises:
    (a) filling a container with a liquid exhibiting a macroscopic magnetic movement,
    (b) subjecting the liquid while in said container to nuclear magnetic resonance including the application of pulsed magnetic fields to produce spin echoes under given polarizing conditions with effective time intervals between said pulsed fields and said echoes which are predetermined to produce signals representative of an apparent diffusion constant of said liquid,
    (c) varying said field conditions and said intervals to cause said signals to vary, and
    (d) measuring said signals in correlation with said intervals and said field conditions.

2. The method of measuring the mean pore size of a porous body saturated with a liquid exhibiting a macroscopic magnetic moment which comprises:
    (a) polarizing the nuclei of said liquid by application thereto of a steady magnetic field,
    (b) upsetting repeatedly the orientation of said nuclei by application of a second magnetic field having abrupt time spaced transitions therein and having vectorial orientation at an angle to that of said steady field to produce spin-echo signals from said nuclei,
    (c) for a given value of time spacing between said transitions varying the degree of inhomogeniety of said steady magnetic field to establish from said echo signals a function representative of the apparent self diffusion constant of said liquid,
    (d) varying said time spacing over a range in which interference with diffusive movements of molecules in said liquid is encountered at the boundaries of the pore spaces in said body to produce variations in said apparent diffusion constant, and
    (e) registering functions representative of the apparent values of diffusion constant in correlation with the value of said time spacing.

3. The method of measuring the mean pore size of a core saturated with a hydrogenous liquid exhibiting a macroscopic magnetic moment which comprises:
    (a) polarizing the nuclei of said liquid in said core by application thereto of a steady magnetic field,
    (b) upsetting repeatedly the orientation of said nuclei by application of a second magnetic field having time spaced transitions therein and having vectorial orientation at an angle to that of said steady field to produce spin-echo signals from said nuclei,
    (c) for a given value of the time spacing between said transitions establishing a function representative of self diffusion constant of said liquid,
    (d) varying said time spacing over a range in which interference with diffusive movement of molecules in said liquid is encountered at the boundaries of the pore spaces in said core to produce variations in said apparent diffusion constant, and (e) registering functions representative of the apparent values of diffusion constant in correlation with the values of said timing spacing.

4. The method of measuring the mean pore size of a porous body saturated with a liquid exhibiting a macroscopic magnetic moment which comprises:

(a) polarizing the nuclei of said liquid in a steady magnetic field, (b) applying to said nuclei time spaced magnetic field pulses having a vectorial orientation at an angle to that of said steady field to produce spin-echo signals from said nuclei, (c) at each value of time spacing between said pulses generating a function representative of an apparent self diffusion constant of said liquid, (d) varying said time spacing over a range in which interference at the boundaries of the pore spaces in said body modify the normal movement of molecules of said liquid to produce an apparent variation in said diffusion constant, and (e) registering functions representative of the apparent values of diffusion constant in correlation with the values of said time spacing.

References Cited by the Examiner
UNITED STATES PATENTS

| | | | |
|---|---|---|---|
| 2,705,790 | 4/55 | Hahn | 324—0.5 |
| 2,968,761 | 1/61 | Zimmerman et al. | 324—0.5 |

OTHER REFERENCES

Carr et al.: Physical Review, vol. 94, No. 3, May 1, 1954, pp. 630–638.

Fernbach et al.: Journal of Applied Physics, vol. 26, No. 2, February 1955, pp. 170 to 181 inclusive.

Powles et al. Nature, vol. 180, No. 4598, Dec. 14, 1957, pp. 1344 and 1345.

Powles et al.: Archives des Sciences, vol. 11, Special Colloque Ampere Edition, July 1, 1958, pp. 209 to 214 inclusive.

Douglass et al.: Journal of Physical Chemistry, vol. 62, No. 9, September 1958, pp. 1102 to 1107 inclusive.

Winkler: (1) Archives des Sciences, Colloque Ampere, vol. 12 April 3, 1959, pp. 161 to 163; (2) Zeitscrift für Naturfoshung, vol. 16a, No. 8, August 1961, pp. 780 to 790 inclusive.

Garwin et al.: Physical Review, vol. 115, No. 6, Sept. 15, 1959, pp. 1478 to 1492 inclusive.

CHESTER L. JUSTUS, *Primary Examiner.*

KATHLEEN H. CLAFFY, MAYNARD R. WILBUR,
*Examiners.*

UNITED STATES PATENT OFFICE
CERTIFICATE OF CORRECTION

Patent No. 3,213,355　　　　　　　　　　　　October 19, 1965

Donald E. Woessner

It is hereby certified that error appears in the above numbered patent requiring correction and that the said Letters Patent should read as corrected below.

Column 1, line 57, after "that" insert -- a --; column 6, line 70, for "eror" read -- error --; same line 70, strike out "the"; column 8, line 22, for "movement" read -- moment --; line 26, before "conditions" insert -- field --; line 46, for "of time" read -- of the time --; line 58, for "value" read -- values --; column 9, line 5, for "timing" read -- time --; column 10, line 14, for "Zeitscrift" read -- Zeitschrift --.

Signed and sealed this 21st day of June 1966.

(SEAL)
Attest:

ERNEST W. SWIDER
Attesting Officer

EDWARD J. BRENNER
Commissioner of Patents